(12) United States Patent
Bacus et al.

(10) Patent No.: US 8,712,937 B1
(45) Date of Patent: Apr. 29, 2014

(54) PREDICTING POPULARITY OF ELECTRONIC PUBLICATIONS

(75) Inventors: Michael Patrick Bacus, Seattle, WA (US); Sandesh S. Singh, Stony Brook, NY (US)

(73) Assignee: Amazon Technologies, Inc., Reno, NV (US)

( * ) Notice: Subject to any disclaimer, the term of this patent is extended or adjusted under 35 U.S.C. 154(b) by 280 days.

(21) Appl. No.: 13/231,709

(22) Filed: Sep. 13, 2011

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC .......................................................... 706/20

(58) Field of Classification Search
None
See application file for complete search history.

(56) References Cited

U.S. PATENT DOCUMENTS

| 6,826,594 | B1 * | 11/2004 | Pettersen ...................... 709/203 |
| 2008/0270484 | A1 * | 10/2008 | Borkovsky et al. ........... 707/200 |
| 2011/0040632 | A1 * | 2/2011 | Margasahayam et al. . 705/14.69 |

OTHER PUBLICATIONS

Yu et al. "PEBL: Positive Example Based Learning for Web Page Classification Using SVM", SIGKDD 2002, pp. 239-248.*
Yanbe et al. ("Towards Improving Web Search by Utilizing Social Bookmarks", ICWE 2007, pp. 343-357.*

* cited by examiner

*Primary Examiner* — Li-Wu Chang
(74) *Attorney, Agent, or Firm* — Lowenstein Sandler LLP

(57) ABSTRACT

A popularity prediction module receives an electronic media item and identifies a feature of the electronic media item. The popularity prediction module applies the feature of the electronic media item to a learned function, where the learned function is determined from a plurality of features from one or more other electronic media items that meet a popularity classification. The popularity prediction module predicts a popularity of the electronic media item based on the comparing, before providing the electronic media item to a user.

18 Claims, 9 Drawing Sheets

PREDICTING POPULARITY OF ELECTRONIC PUBLICATIONS

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like.

The electronic media items may be provided by a digital content provider. The digital content provider may make a number of electronic media items available to the users for purchase, rental, non-fee usage, etc. Users may download or receive these electronic media items to their electronic devices for consumption. Certain electronic media items provided by the digital content provider may be enhanced with additional enriched content features. In many cases, not all electronic media items are similarly enhanced as it may be prohibitively expensive and time consuming to provide this enriched content for every electronic media item provided by the digital content provider. Only a subset of the electronic media items, for example the most popular items, may be enhanced with the enriched content. Currently, however, there is no way to predict which electronic media items will be among the most popular items. Thus, the enriched content may only be added to electronic media items after they have been available from the digital content provider for a period of time and have proven to be popular. This means that often times a large portion of the users (i.e., a first portion of users who downloaded the electronic media items soon after their release) are not able to enjoy the benefits of the enriched content.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a popularity prediction module that receives an electronic media item and predicts a popularity of the electronic media item before providing the electronic media item to a user. The popularity prediction module predicts the popularity of the electronic media item by applying a feature of the electronic media item to a learned function. In one embodiment, the learned function is determined using a plurality of features from one or more other electronic media items that meet a popularity classification. The popularity classification may be based on a number of glance views received by the one or more other electronic media items. Predicting the popularity of an electronic media item before providing it to a user allows an enriched content module to enhance the electronic media item by adding an enriched content feature. The enriched content feature may include, for example, an audit of the electronic media item, a page number side car, a start reading location or an end reading location.

Predicting the popularity of an electronic media item before providing it to a user allows the enriched content to be enjoyed by all users of the electronic media item, whereas waiting to determine if the electronic media item will be popular before adding the enriched content means that often times a large portion of the users (i.e., a first portion of users who downloaded the electronic media items soon after their release) are not able to enjoy the benefits of the enriched content.

Figure 1:
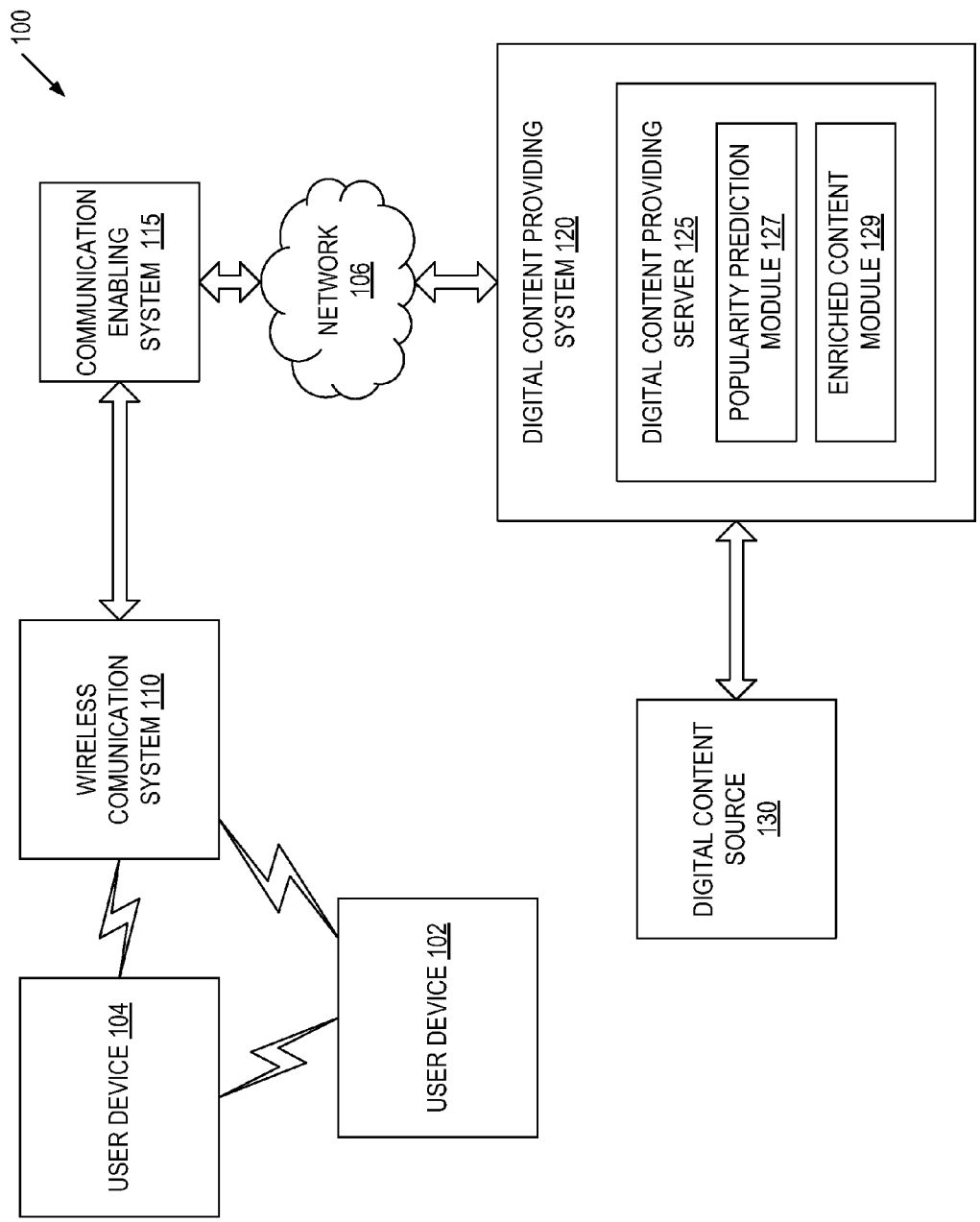
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic publications (e.g., electronic books) to users upon the users' purchase of the items. In this role, the digital content providing server 125 may essentially act as a bookseller or the like. In other cases, the digital content providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic publications (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic publications) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, digital content providing server 125 may include popularity prediction module 127. Popularity prediction module 127 may make a prediction pertaining to the relative popularity of an electronic media item that digital content providing server 125 may use in any number of ways. In one embodiment, the prediction may include whether the electronic media item (e.g., an ebook) will meet a popularity classification within a certain period of time. Popularity prediction module 127 may make a prediction for electronic media items currently offered to users by digital content providing server 125 or for newly received electronic media items from digital content source 130 before they are provided to a user. Digital content source 130 may be, for example, a publisher, author, creator, etc. of electronic publications or other digital content that provides the digital content to be distributed by digital content providing system 120.

In one embodiment the popularity classification may be defined in terms of glance views. Glance views may include a number of times that a user (e.g., through one of user devices 102, 104) examines, views, clicks-on, or otherwise selects an electronic media item from a list of media items, or a digital content library, provided by digital content providing server 125. A counter storing an integer value for the glance views may be incremented each time one such event occurs, even though the user may not actually purchase, download or receive the electronic media item. The popularity of an electronic media item may be judged by the number of glance views it receives. In one embodiment, the popularity classification may be based on the number of glance views, such as whether the electronic media item is one of a set of items on which a certain percentage (e.g., 90%) of glance views occurred (or will occur) in a certain period of time (e.g., 90 days). This particular classification may be referred to as GV90T90. In other embodiments, other classifications may be used varying the percentage (e.g., 50% (GV50T90), 10% (GV10T90)) or the period of time (e.g., GV10T30 for 30 days, GV10T60 for 60 days). In yet other embodiments, some other classification may be used to determine popularity, such as commercial success, critical acclaim, inclusion on a "best-seller" list, etc.

In one embodiment, the prediction made by popularity prediction module 127 may be a binary determination (e.g., the electronic media item will be popular or not). This prediction may be made by determining whether or not the electronic media item will meet the popularity classification. The popularity classification may be variable and may be configured by a user, tester, system administrator, etc. to suit the specific needs of the implementation. In other embodiments the prediction may include an indication of how popular the electronic media item will be.

In another embodiment, digital content providing server 125 may also include enriched content module 129. Enriched content module 129 may enhance an electronic media item to include certain enriched content features. In one embodiment, enriched content module 129 may add the enriched content to an electronic media item depending on the output of popularity prediction module 127. For example, enriched content module 129 may only add the enriched content to electronic media items that meet the current popularity classification. The enriched content features provided by enriched content module 129 may include, for example, a quality assurance audit to verify correctness of metadata and other features of the electronic media item, page number side cars to include page numbers from a physical printed copy of a book in an ebook or other electronic publication, start reading location or end reading location for an electronic publication, or other features. Popularity prediction module 127 and enriched content module 129 are described in greater detail below with reference to FIGS. 2-7.

Figure 2:
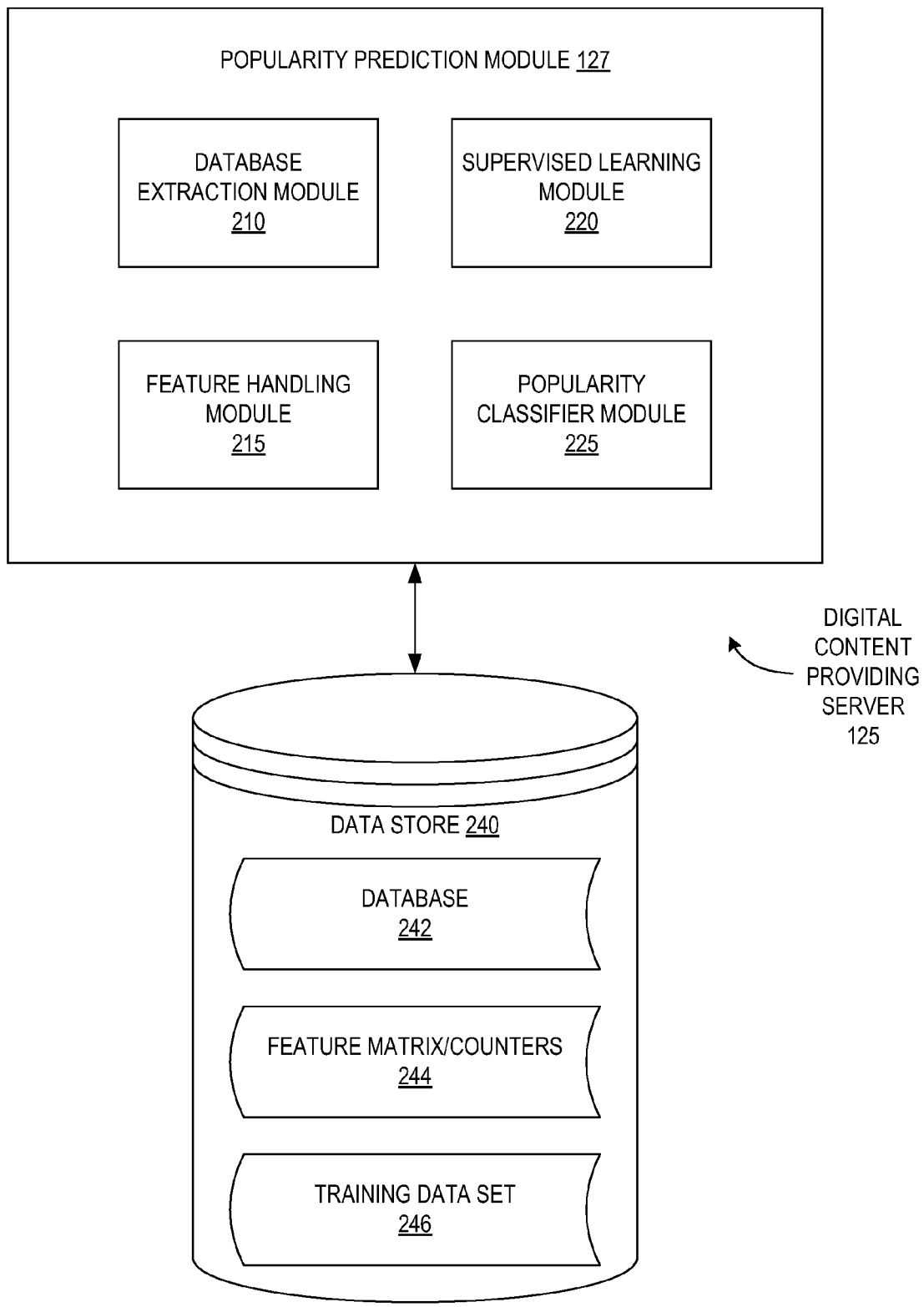
FIG. 2 is a block diagram illustrating a popularity prediction module, according to an embodiment.

FIG. 2 is a block diagram of one embodiment of a popularity prediction module 127 that may be included in a server, which may correspond to digital content providing server 125 of FIG. 1. In one embodiment, digital content providing server 125 includes popularity prediction module 127, which may include database extraction module 210, feature handling module 215, supervised learning module 220 and popularity classifier module 225. In one embodiment, popularity prediction module 127 is connected to a data store 240, which may be a file system, database or other data management layer resident on a data storage device such as a disk drive, RAM, ROM, database, etc. Data store 240 may include database 242, feature matrix and counters 244 and training data set 246.

Database 242 may contain information about each electronic media item that is offered by digital content providing server 125 to the users of user devices 102, 104. Database 242 may contain bibliographic information about each item such as author, title, identifier (e.g., International Standard Book Number (ISBN), Amazon Standard Identification Number (ASIN)), publisher, publication date (physical copy and electronic copy), length, etc. Database 242 may also include other information about each item, such as price, readability information (e.g., Automated Readbility Index, Flesch Kincaid Reading Ease, Flesch Kincaid Grade Level, Gunning Fox Index), language, topics, abstract, etc. Database 242 may also include a popularity classification (e.g., a glance view (GV) status) indicative of the popularity of the electronic media item. In one embodiment this information may be referred to as features of the electronic media items. A feature can be a characteristic of the item as it would normally be understood by a user of that item, such as an explicit numerical value, a hash, or a string, or some other representation of that characteristic more suitable for the numerical analysis used in both building classifiers and using classifiers to make predictions. This information from database 242 may be used by popularity prediction module 127 to make predictions about the popularity of other electronic media items.

In one embodiment, database extraction module 210 may extract (or read) information from database 242 for certain electronic media items. For example, database extraction module 210 may extract information for a certain set of electronic media items or from a certain period of time. Feature handling module 215 may examine the features of the extracted data to identify certain features. In one embodiment, feature handling module 215 may identify electronic media items that meet a certain popularity classification (e.g., GV90). Feature handling module 215 may also identify other features of those electronic media items that meet the popularity classification. Popularity prediction module 127 can look for those same features in new electronic media items when making a prediction as to their eventual popularity.

In one embodiment, the features identified by feature handling module 215 from the information in database 242 extracted by database extraction module 210, are used to update one or more counters in a feature matrix 244. Feature matrix 244 may include a number of counters for a particular feature (e.g., a certain author or a certain publisher). Feature handling module 215 may increment the counters for each occurrence of a particular feature. In one embodiment, feature matrix 244 may include separate counters for each occurrence of the feature in any electronic media item in database 242 and for each occurrence of the feature in a GV90 (or other classification) electronic media item. An example of feature matrix 244 is shown below in Table 1.

TABLE 1

| Feature | Total Number | Number of GV90 Items |
|---|---|---|
| Author: John Doe | 13 | 7 |
| Publisher: Acme Publishing | 245 | 82 |
| Category: Romance | 899 | 116 |
| ... | | |

In another embodiment, feature handling module 215 may identify features directly from the electronic media item (i.e., content based features), rather than from the metadata in feature matrix 244. For example, feature handling module 215 may scan the text of an electronic publication to identify a readability metric and/or perform topic analysis. Readability metrics indicate how difficult/easy is the material in the book to understand, for the average reader. This may be determined according to a known algorithm by feature handling module 215 and stored, for example in feature matrix 244. Manual annotation of book categories can assign only a single category to each book (as shown in Table 1), however, a book may transcend multiple themes, and automatic topic analysis helps discover such topics. Topic analysis allows the system to define a given number of topics, and the words most associated with those topics. Given the words in the book, feature handling module 215 can determine how they associate to each of those topics. Since these topics are based on actual words in the book, they capture all the nuances in the book, subtle as they might be.

In one embodiment, the counter data from feature matrix 244 and/or the features obtained directly from the electronic media item may be used by supervised learning module 220 to generate a training data set 246. Training data set 246 may represent data from previously released electronic media items for which actual sales and popularity data is known. Popularity classifier module 225 may compare the features of a new electronic media item to training data set 246 in order to predict whether that new electronic media item will be popular. In one embodiment, the feature data identified by feature handling module 215 is converted into a classifier through a process called supervised learning. Supervised learning may include the machine learning task of inferring a function from supervised training data (e.g., training data set 246). The training data may consist of a set of training examples. In supervised learning, each example may include a pair consisting of an input object (e.g., a vector of numeric features) and a desired output value (which may also be called the supervisory signal—in one embodiment, the popularity classification (e.g. GV90 or non GV90)). A supervised learning algorithm may analyze the training data set 246 and produces a learned function, which is called a classifier (if the output is discrete). The learned function may be used by popularity classifier module 225 to predict the correct output value for any valid input object (i.e., a set of features for a new electronic publication). Additional details of popularity prediction module 127 are discussed below with respect to FIGS. 3 and 4.

Figure 3:
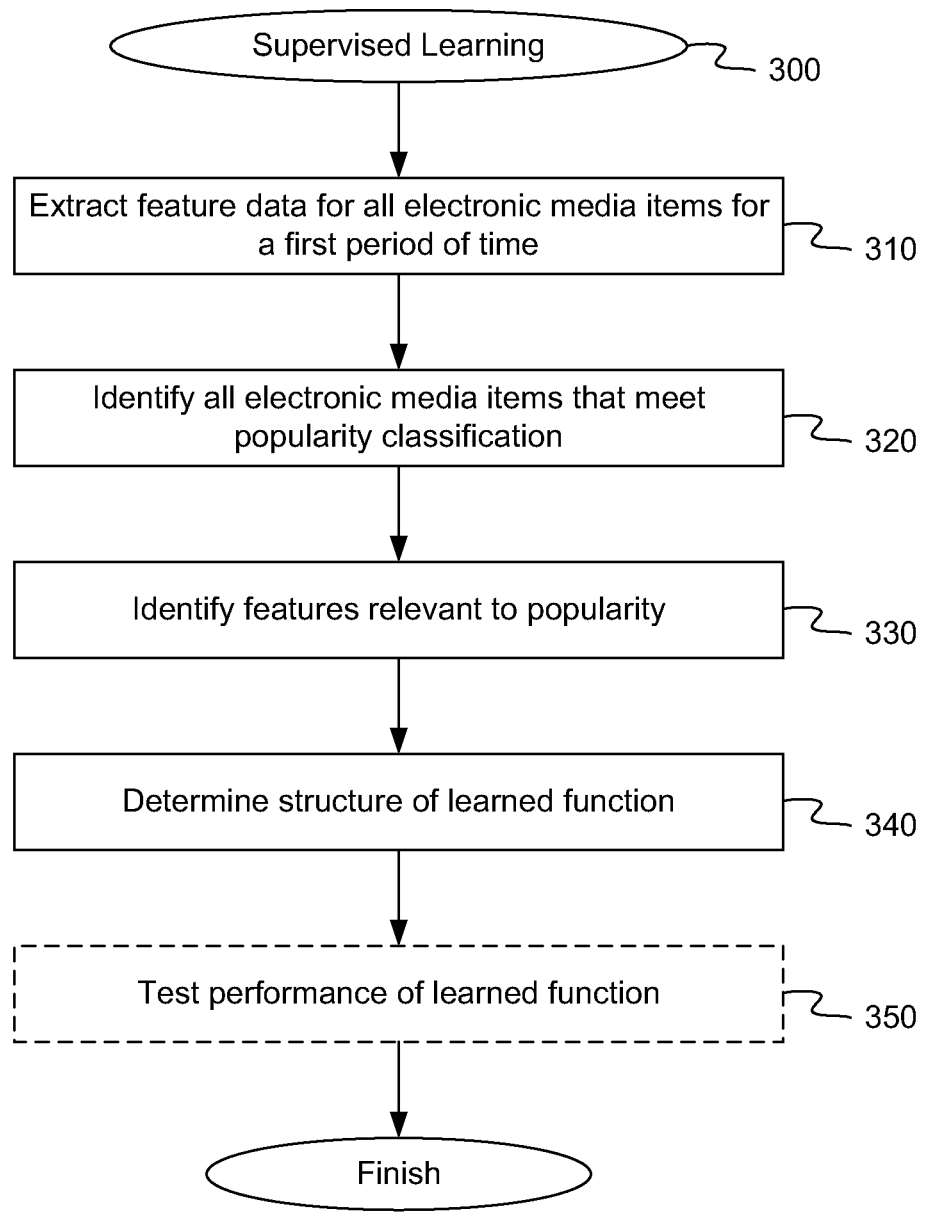
FIG. 3 is a flow diagram illustrating a supervised learning method, according to an embodiment.

FIG. 3 is a flow diagram illustrating a supervised learning method, according to an embodiment of the present invention. The method 300 may be performed by processing logic that comprises hardware (e.g., circuitry, dedicated logic, programmable logic, microcode, etc.), software (e.g., instructions run on a processor to perform hardware simulation), or a combination thereof. The processing logic is configured to establish a training data set and a learned function to be used for predicting popularity of electronic publications. In one embodiment, method 300 may be performed by popularity prediction module 127, as shown in FIGS. 1 and 2.

Referring to FIG. 3, at block 310, method 300 extracts feature data from database 242 for all electronic media items in a first period of time. In one embodiment, the first period of time may be 90 days. Database extraction module 210 may extract the data and feature handling module 215 may identify one or more features associated with each electronic media item. The feature data may include, for example, raw data, obtained from feature matrix 244 or directly from the electronic media items, which is used to build the classifier. Raw data may be used directly in the learned function and may include features such as, the GV status of a printed publication corresponding to the electronic media item. Certain forms of preprocessing may also be performed for the feature data before it is used by the classifier. For example, for publisher information, a GV score for all items published by a certain publisher may be aggregated and averaged to form a feature data value.

In one embodiment, extracting the feature data for the electronic media items may include incrementing the feature counters of feature matrix 244 for the features of the electronic media items that meet the popularity classification. Feature handling module 215 may identify the features from the information in database 210 and may increment the counters by one for each occurrence of a particular feature. For example if an electronic media item (e.g., an ebook) is a member of GV90, its features may include Author: John Doe, Publisher: Acme Publishing, Category: Romance, among other features. Feature handling module 215 would thus increment the corresponding counters in feature matrix 244, accordingly.

Over time the feature data used in supervised learning method 300 may be updated. For example, once a week, feature handling module 215 may update the data used to create the training data set 246. In one embodiment, one day each week (although this period may be configurable), a process may be run to consolidate glance view statistics for the week ending that day. If certain electronic media items were added to or removed from GV90 during the past week, their status may be updated in database 242. In one embodiment, feature handling module 215 decrements the counters in feature matrix 244 for each feature in the old feature data that was excluded. This ensures that the counters are not affected by stale data. This allows predictions to be made by popularity prediction module 127 using the most current data.

At block 320, method 300 identifies the electronic media items from database 242 that meet a popularity classification. In one embodiment, the popularity classification may be defined as those books that are classified as GV90. The GV90 status may be one of the features stored in database 242 for the electronic media item.

At block 330, method 300 identifies features relevant to popularity. In one embodiment, supervised learning module 220 identifies which features are most often associated with electronic media items that meet the popularity classification. In other words, supervised learning module 220 may determine the input feature representation of the learned function. The accuracy of the learned function depends strongly on how the input object is represented. For example, the input object may be transformed into a feature vector, which contains a number of features that are descriptive of the corresponding electronic media item. The number of features should not be too large, because of the curse of dimensionality (over fitting the data set), but should contain enough information to accurately predict the output (i.e., the popularity classification).

At block 340, method 300 determines the structure of the learned function. In one embodiment, logistic regression is used for prediction of the probability of occurrence of an event by fitting data to a logistic curve. The logistic regression may include a generalized linear model used for binomial regression. Like many forms of regression analysis, it may make use of several predictor variables that may be either numerical or categorical. An explanation of logistic regression begins with an explanation of the logistic function, which, like probabilities, takes on a value between zero and one:

$$f(z) = \frac{e^z}{e^z + 1} = \frac{1}{1 + e^{-z}} \qquad (1)$$

In equation 1, shown above, the input is z and the output is f(z). The logistic function is useful because it can take as an input any value from negative infinity to positive infinity, whereas the output is confined to values between zero and one. The variable z represents the exposure to some set of independent variables, such as the feature data extracted at block 310, while f(z) represents the probability of a particular outcome (e.g., popular or not popular), given that set of explanatory variables. The variable z is a measure of the total contribution of all the independent variables used in the model.

Optionally, at block 350, method 300 tests the performance of the learned function determined at block 340. Supervised learning module 220 may evaluate the accuracy of the learned function. After parameter adjustment and learning, the performance of the resulting function may be measured on a test set that is separate from the training data set 246. A wide range of supervised learning algorithms are available, each with its strengths and weaknesses, and one of skill in the art would understand that any applicable algorithm may be used. In one embodiment, logitBoost (Additive Logistic Regression) may be used due to the asymmetry of the feature data. There may be a lot more non-GV90 ebooks than GV90, and logitBoost is designed for analyzing asymmetric training sets.

Figure 4:
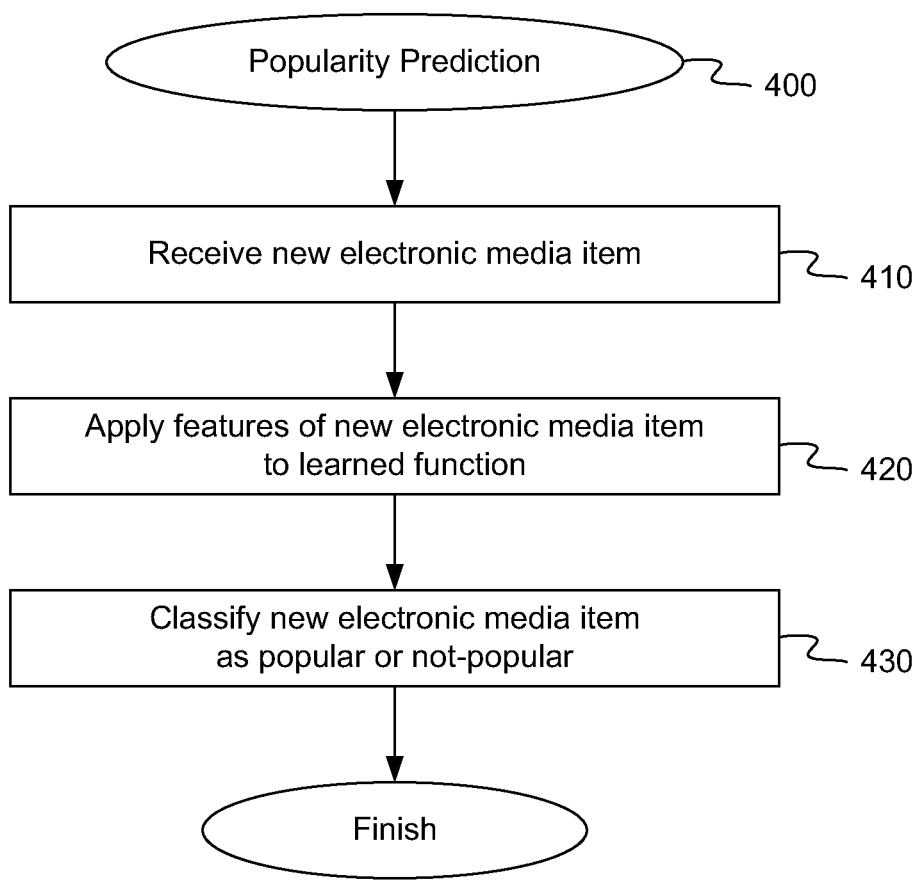
FIG. 4 is a flow diagram illustrating a popularity prediction method, according to an embodiment.

FIG. 4 is a flow diagram illustrating a popularity prediction method, according to an embodiment of the present invention. The method 400 may make a popularity prediction for a newly received electronic media item. In one embodiment, method 400 may be performed by popularity prediction module 127, as shown in FIGS. 1 and 2.

Referring to FIG. 4, at block 410, method 400 receives a new electronic media item. In one embodiment, the new electronic media item may be received by digital content providing system 120 from digital content source 130 to be provided to users of user devices 102, 104. In one embodiment, method 400 may be performed immediately as each new electronic media item is received, however in other embodiments, newly received items may be held for a certain period of time (e.g., until the end of the day) and then method 400 is performed for each item received during that time. At block 420, method 400 applies the features of the new electronic media item to the learned function established by method 300. Popularity classifier module 225 may identify each feature of the new electronic media item (and a corresponding feature vector) and apply it to the learned function (i.e., as the input variable z in the equation 1 shown above). Since the learned function is a logistic regression formula, the output of the function will provide a prediction based on the popularity classification (popular or not popular and a confidence score (i.e., how likely the prediction is to be correct).

Based on the comparison of block 420, at block 430, method 400 makes a prediction that classifies the new electronic media item as popular or not popular. This popularity prediction may be stored in an entry of database 242 associated with the new electronic media item. Digital content providing system 120 may use the prediction for any number of uses, such as for example, deciding whether to enhance the new electronic media item with enriched content before making it available to the users of user device 102, 104.

Figure 5:
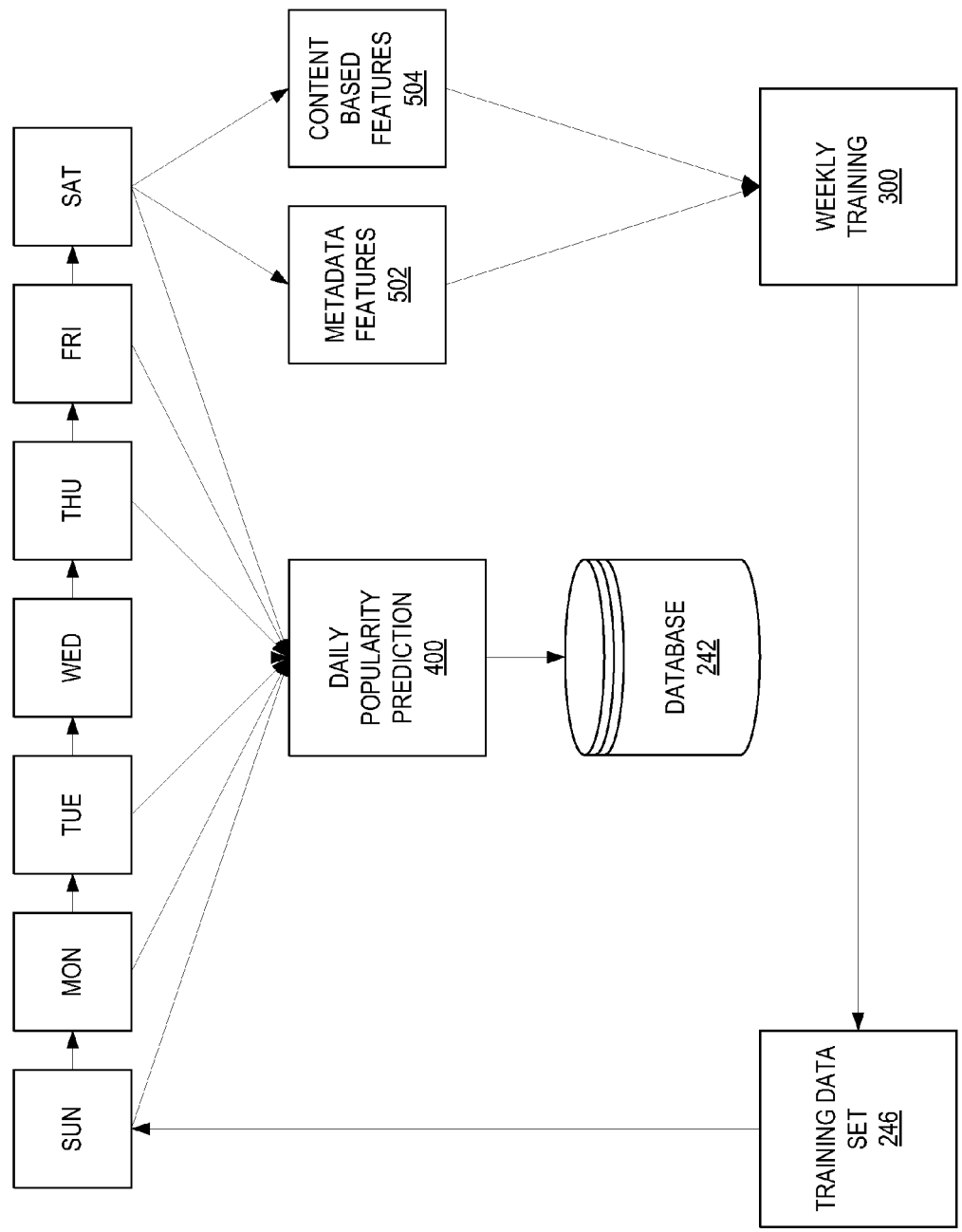
FIG. 5 is a block diagram illustrating a data flow of the supervised learning method and the popularity prediction method, according to an embodiment.

FIG. 5 is a block diagram illustrating a data flow of the supervised learning method and the popularity prediction method, according to an embodiment of the present invention. This embodiment illustrates a time frame of one week (i.e., Sunday through Saturday). Each day of the week, a daily popularity prediction is performed according to method 400 of FIG. 4. In one embodiment, method 400 may be performed immediately as each new electronic media item is received, however in other embodiments, newly received items may be held for a certain period of time (e.g., until the end of the day) and then method 400 is performed for each item received during that time. The results of the prediction may be stored in database 242.

One day each week (e.g., Saturday), weekly training to create or maintain training data set 246 and update the learned function is performed according to method 300 of FIG. 3. In one embodiment, method 300 uses metadata features 502, such as those from feature matrix 244, as well as content based features 504 to create or maintain training data set 246. Training data set 246 may be used by popularity prediction module 127 to make the prediction for a newly received electronic media item. The process may itself each week (or whatever period of time has been defined).

Figure 6:
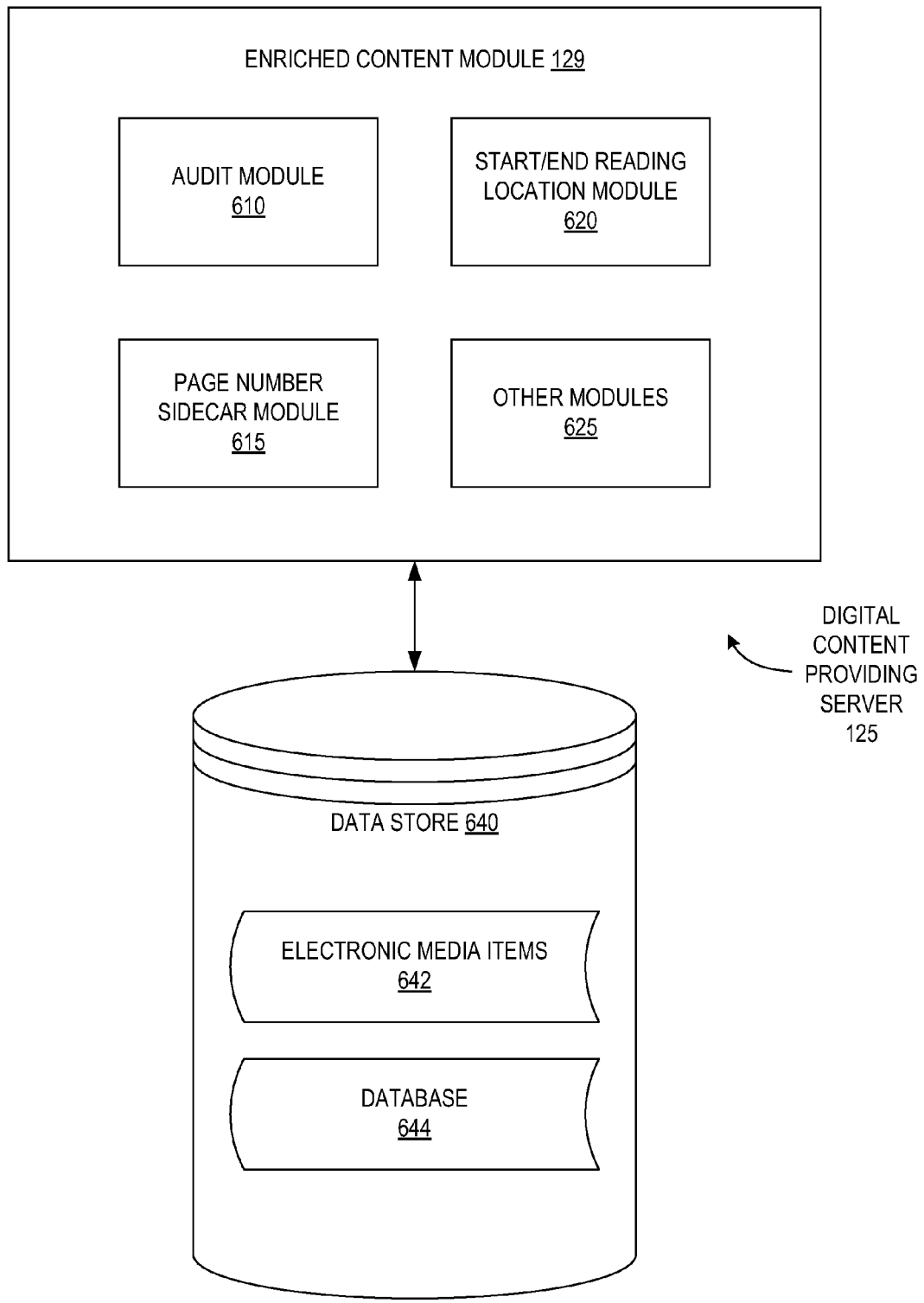
FIG. 6 is a block diagram illustrating an enriched content module, according to an embodiment.

FIG. 6 is a block diagram of one embodiment of an enriched content module 129 that may be included in a server, which may correspond to digital content providing server 125 of FIG. 1. In one embodiment, digital content providing server 125 includes enriched content module 129, which may include audit module 610, page number sidecar module 615, start/end reading location module 620, and other modules 625. In one embodiment, enriched content module 129 is connected to a data store 640, which may be a file system, database or other data management layer resident on a data storage device such as a disk drive, RAM, ROM, database, etc. Data store 640 may include electronic media items 642 and database 644. In one embodiment, data store 640 may be the same as data store 240 discussed above with respect to FIG. 2, however, in other embodiments, they may be separate.

Enriched content module 129 may receive a popularity prediction for an electronic media item, such as one of electronic media items 642, from popularity prediction module 127. The prediction may include an indication of whether or not the electronic media item will be popular. If the prediction indicates that the electronic media item will be popular, enriched content module 129 may enhance the electronic media item by adding enriched content. The enriched content has many possible forms, several examples of which are described below.

In one embodiment, audit module 610 may perform an all field audit to verify the correctness of data and metadata associated with an electronic media item. The electronic media items 642 in data store 640 may contain data for the item itself (e.g., an ebook) as well as metadata describing the electronic media item. Audit module 610 may examine each field in the data and metadata to identify any errors or omissions. For example, audit module may verify that the ebook contains the proper formatting, includes a title page, table of contents, etc., that all pages/chapters/sections of the ebook are present and in the correct order, etc. Audit module 610 may also examine the metadata to verify that the title, author, publisher, date, length, category, etc. all contain the correct values. The metadata may be stored with the data for electronic media items 642. If there are any errors, omissions, or inconsistencies, audit module 610 may automatically fix the mistake or flag the electronic media item for further examination by a another program or by a human.

In one embodiment, page number sidecar module 615 may add page numbers for a published printed copy of a publication to an electronic media item 642. Thus, a user of user device 102, 104, when consuming an electronic media item 642 can match up their location in the ebook, for example, with a corresponding page in a physical copy of the same book. Database 644 may contain, for example, an electronic scan of the physical copy of the book or an indication of the page numbers and page breaks for the physical copy. In one embodiment, database 644 may be the same database as database 242, discussed above with respect to FIG. 2, however, in other embodiments, they may be separate. Page number sidecar module 615 may examine the data from database 644 pertaining to page numbers and identify the corresponding locations in the electronic media items 642. Page number sidecar module 615 may add an indication of the location of the page breaks and/or page numbers from the physical copy to either the actual data of the electronic media item or the metadata stored with electronic media items 642.

In one embodiment, start/end reading location module 620 maintains an indication of where the actual content of an electronic publication, such as one of electronic media items 642, begins and ends. Certain media items, such as an ebook, may contain additional information at the front, such as a title page, table of contents, etc., and at the end, such as an author biography, etc. The start reading location and end reading location is a convenience to the user so that they may skip immediately to the location where the actual content of the publication begins without spending time paging through the additional information.

In other embodiments, enriched content module 129 may contain one or more other modules 625 configured to provide any number of other content enrichment features.

Figure 7:
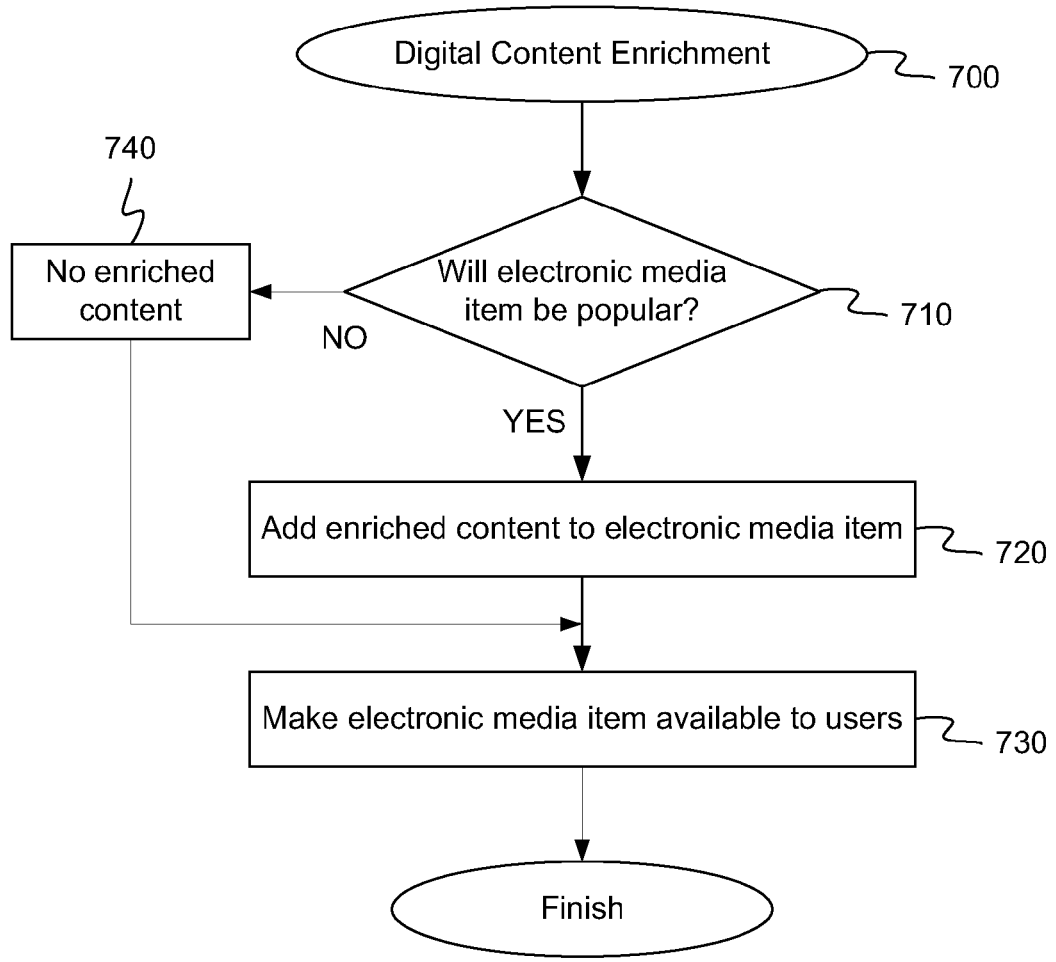
FIG. 7 is a flow diagram illustrating a digital content enrichment method, according to an embodiment.

FIG. 7 is a flow diagram illustrating a digital content enrichment method, according to an embodiment of the present invention. The method 700 may enhance an electronic media item by adding enriched content. In one embodiment, method 700 may be performed by enriched content module 129, as shown in FIGS. 1 and 6.

Referring to FIG. 7, at block 710, method 700 receives an indication indicating whether or not an electronic media item will be popular. The indication may be received from popularity prediction module 127 and be made according to method 400. If the indication at block 710 indicates that the electronic media item will be popular, at block 720, method 700 adds enriched content to the electronic media item. For example, audit module 610 may perform an all field audit for the data and metadata of the electronic media item, page number sidecar module 615 may add an indication of the page numbers from a physical printed copy of the publication corresponding to the electronic media item, start/end reading location module 620 may add an indication of the starting or ending location in the electronic media item, or another module 725 may add some other enriched content feature. The enriched content features may be added to or modify the electronic media items 642 stored in data store 640. At block 730, method 700 makes the electronic media item available to users of user devices 102, 104. The users may purchase, download, receive, etc. the enhanced electronic media item from digital content providing system 120.

In one embodiment, if at block 710, method 700 determines that the electronic media item will not be popular, at block 740, method 700 does not add any enriched content to the electronic media item. Method 700 continues to block 730 and makes the electronic media item available to users without the enriched content.

In other embodiments, the popularity prediction made by method 400 may be used for other applications. For example, a prediction may be made for an unpublished manuscript of a book or ebook. A book publisher, such as publisher 130, may receive the prediction from popularity prediction module 127. The book publisher may make a decision on whether or not to publish the manuscript based on the results of the prediction. In another example, a prediction may be made for a song or album. Features of the song or album may be compared to a training data set to make a prediction so that a record label can decide whether or not to release the song or album for sale. These are merely a few examples of the possible applications for these techniques and one of skill in the art would recognize that there are many other possibilities.

Figure 8:
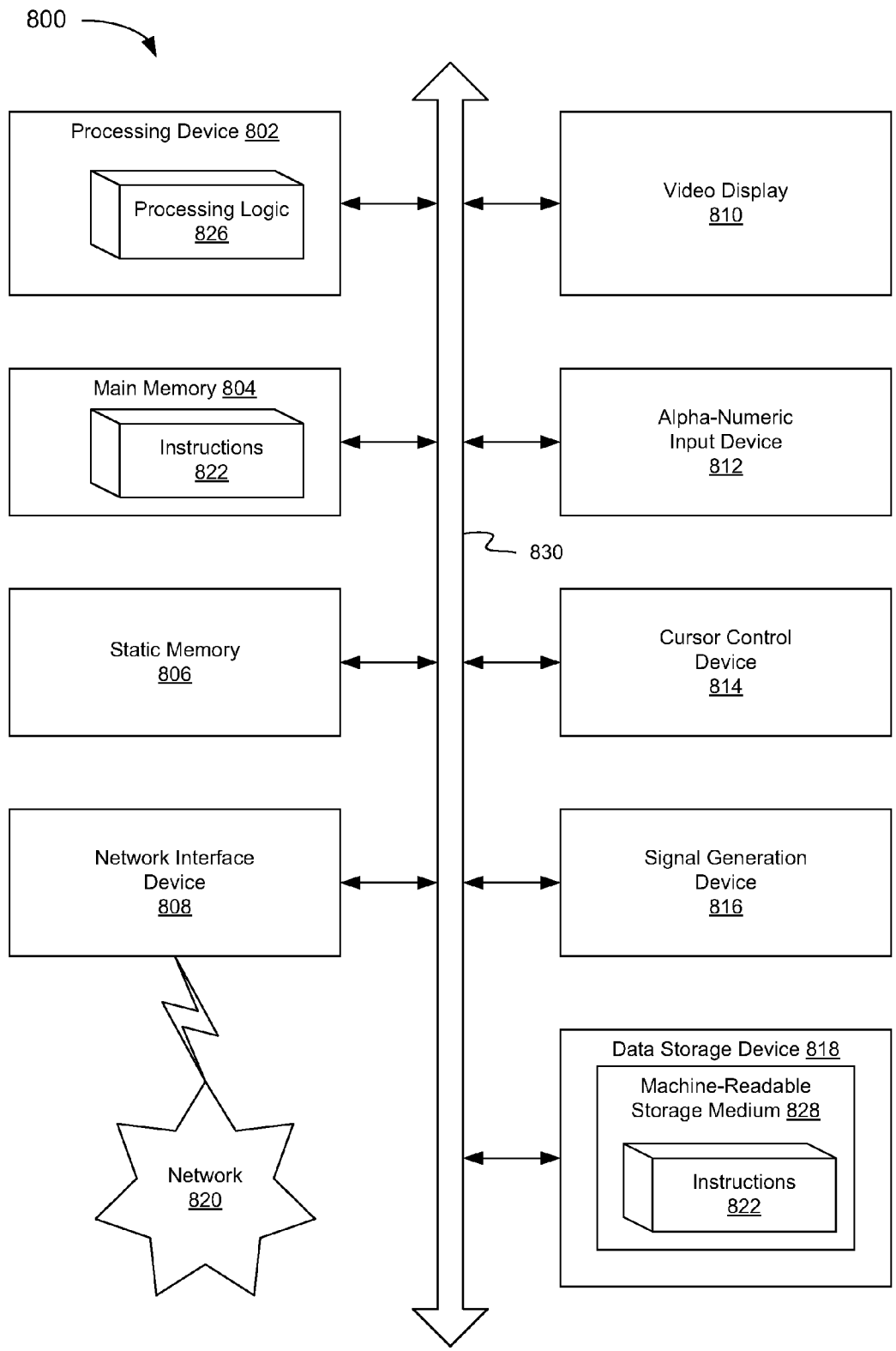
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the popularity prediction module 127 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of popularity prediction module 127) embodying any one or more of the methodologies or functions described herein. The instructions 822 may also reside, completely or at least partially, within the main memory 804 and/or within processing logic 826 of the processor 802 during execution thereof by the computer system 800, the main memory 804 and the processor 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 9:
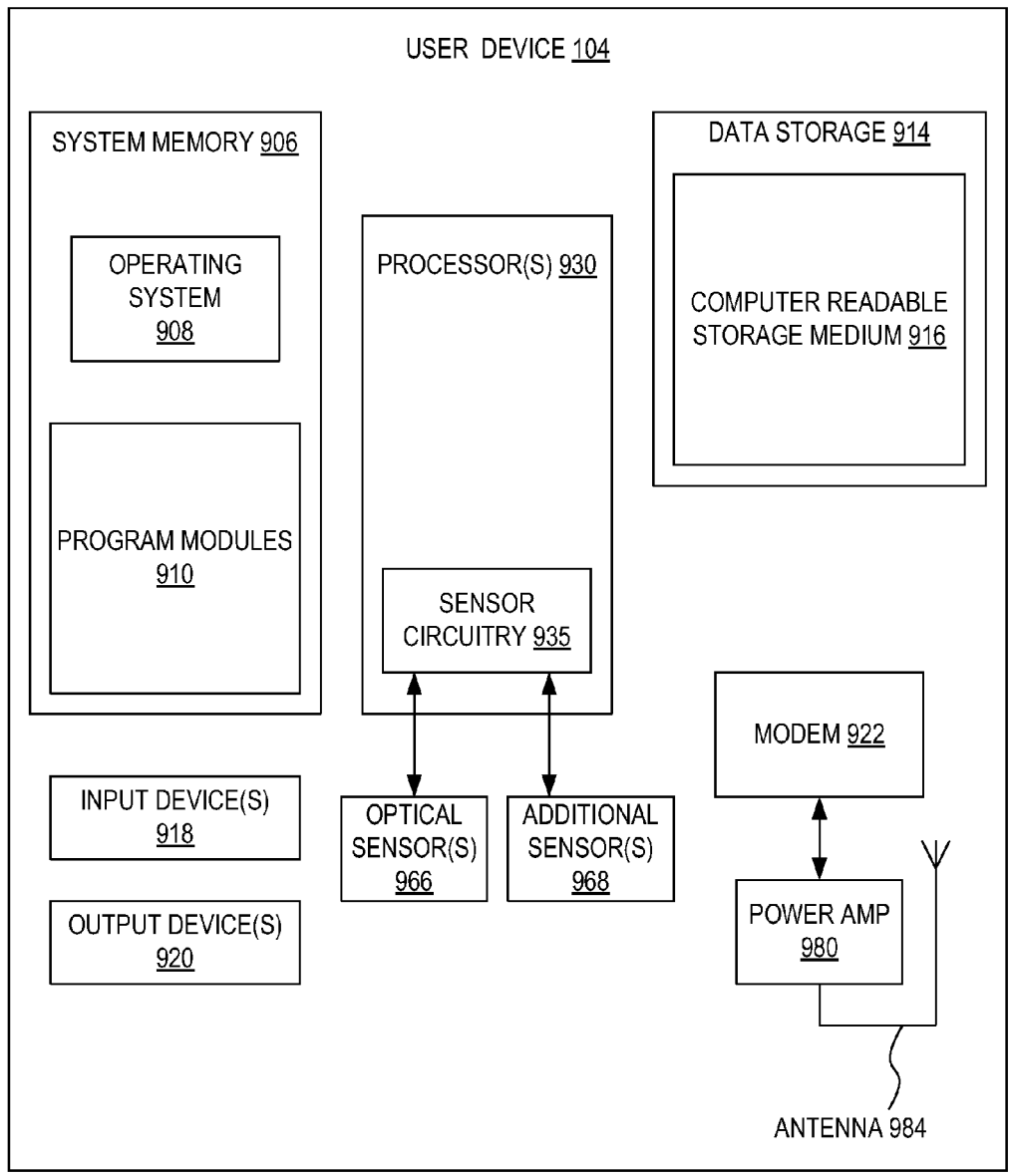
FIG. 9 is a block diagram illustrating an exemplary user device, according to an embodiment.

FIG. 9 is a block diagram illustrating an exemplary user device 104. In one embodiment, the user device 104 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 104 includes one or more processing devices or processors 930, such as one or more CPUs, microcontrollers, field programmable gate arrays, or other types of processing devices. The user device 104 also includes system memory 906, which may correspond to any combination of volatile and/or non-volatile storage mechanisms. The system memory 906 stores information which provides an operating system component 908, various program modules 910 and/or other components. The user device 104 performs functions by using the processor(s) 930 to execute instructions provided by the system memory 906.

The user device 104 also includes a data storage device 914 that may be composed of one or more types of removable storage and/or one or more types of non-removable storage. The data storage device 914 includes a computer-readable storage medium 916 on which is stored one or more sets of instructions embodying any one or more of the methodologies or functions described herein. As shown, instructions may reside, completely or at least partially, within the computer readable storage medium 916, system memory 906 and/or within the processor(s) 930 during execution thereof by the user device 104, the system memory 906 and the processor(s) 930 also constituting computer-readable media. The user device 104 may also include one or more input devices 918 (keyboard, mouse device, specialized selection keys, etc.) and one or more output devices 920 (displays, printers, audio output mechanisms, etc.).

The user device 104 further includes a wireless modem 922 to allow the user device 104 to communicate via a wireless network (e.g., such as provided by the wireless communication system) and/or with other computing devices, such as remote computers, the item providing system, online book stores, electronic catalogs for libraries, and so forth. The wireless modem 922 may allow the user device 104 to handle both voice and non-voice communications (such as communications for text messages, multimedia messages, media downloads, web browsing, etc.) with the wireless communication system 110. The wireless modem 922 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 922 may generate signals and send these signals to power amplifier (amp) 980 for amplification, after which they are wirelessly transmitted via antenna 984. In addition to sending data, antenna 984 also receives data, which is sent to wireless modem 922 and transferred to processor(s) 930.

In one embodiment, user device 104 includes an optical sensor 966. The optical sensor 966 may be a low resolution camera (e.g., having 0.2 or 0.3 Megapixels) that takes images (e.g., of a user's eyes) on a periodic basis. Alternatively, the optical sensor 966 may have a higher resolution, such as 1 Megapixel up to 10 or more Megapixels. The optical sensor 966 may be positioned such that images are taken of a user's face while the user holds the user device 104 in front of his face in a standard reading position. Therefore, the optical sensor 966 may be used to track user eye movement during reading.

In one embodiment, user device 104 includes one or more additional sensors 968 such as a physical contact sensor, close proximity sensors, or motion sensors. The sensors 968 can detect the presence of human body parts, and convey information regarding the detected presence to processor(s) 930. In one embodiment, the sensors 968 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 968 may also be optical (e.g., infrared) sensors that use an emitter and receiver pair to detect the presence of opaque objects. Alternatively, the sensors 968 may be inductive sensors, which include an inductive loop. When the presence of a human body part (or metal object) is brought close to the inductive sensor, an induction of the inductive loop changes, causing the human body part to be detected. Alternatively, the sensors 968 may be ultrasonic sensors that emit an ultrasonic signal and measure a time duration between when a signal is transmitted and the reflection of that signal received (a.k.a., flight response). The sensors 968 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 968 include a motion sensor, such as an accelerometer or one or more gyroscopes. The user device 104 may use motion data from motion sensors to determine whether a user is holding the user device 104. For example, if the user device 104 experiences constant minor accelerations, it may be determined that the user device 104 is being held in a user's hand. Additionally, if the user device 104 is at a particular angle (detectable based on acceleration readings from an accelerometer), it may be determined that the user device 104 is being rested on a user's leg during reading.

The processor(s) 930 may include sensor circuitry 935 (e.g., sensor device drivers) that enables the processor(s) 930 to interpret signals received from the optical sensor(s) 966 and/or additional sensors 968. In one embodiment, the optical sensors 966 and/or additional sensors 968 output raw sensor data. In another embodiment, the optical sensors 966 and/or additional sensors 968 output fully processed signals to the processor(s) 930. For example, the additional sensors 968 may output a user contact/no user contact signal using a single line interface or a multi-line interface. In another embodiment, the additional sensors 968 output, for example, positional data and/or object presence data (e.g., of a human body part) to the processors 930 without first processing the data. In either instance, the processors 930 may use the sensor circuitry 935 to process and/or interpret the received data. If data is received from multiple sensors, processing the data may include averaging the data, identifying a maximum from the data, or otherwise combining the data from the multiple sensors.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving an electronic media item;
   identifying a feature of the electronic media item;
   applying, by a processor, the feature of the electronic media item to a learned function, wherein the learned function is determined using a plurality of features from one or more other electronic media items that are determined to have met a popularity threshold, wherein an output of the learned function to indicate a predicted relative popularity level of the electronic media item;
   classifying the electronic media item as at least one of popular or not popular in relation to the popularity threshold based on the predicted relative popularity level output from the learned function, before an initial release the electronic media item; and
   when the electronic media item is classified as popular in relation to the popularity threshold, enhancing the electronic media item by adding enriched content before the initial release of the electronic media item.

2. The method of claim 1, wherein the popularity threshold comprises a number of glance views received by the one or more other electronic media items.

3. The method of claim 1, wherein the enriched content comprises at least one of an audit of the electronic media item, a page number side car, a start reading location or an end reading location.

4. The method of claim 1, further comprising:
   providing the electronic media item with the enriched content to the user.

5. The method of claim 1, wherein the feature of the electronic media item comprises a metadata feature.

6. The method of claim 1, wherein the feature of the electronic media item comprises a content-based feature.

7. The method of claim 1, further comprising:
   determining a confidence score for the classification, wherein the confidence score is a result of a logistic regression.

8. A system, comprising:
   a processor; and
   a memory coupled to the processor, the memory storing a popularity prediction module and an enriched content module, executable by the processor and from the memory, the popularity prediction module to:
      receive an electronic media item;
      predict a relative popularity level of the electronic media item using an output of a learned function created using a plurality of features from one or more other electronic media items that are determined to have met a popularity threshold; and
      compare the predicted relative popularity level of the electronic media item to the popularity threshold to classify the electronic media item as at least one of popular or not popular before an initial release of the electronic media item; and
   the enriched content module to:
      when the electronic media item is classified as popular in relation to the popularity threshold, enhance the electronic media item by adding enriched content before the initial release of the electronic media item.

9. The system of claim 8, wherein predicting the popularity of the electronic media item comprises applying a feature of the electronic media item to the learned function.

10. The system of claim 8, wherein the popularity threshold comprises a number of glance views received by the one or more other electronic media items.

11. The system of claim 8, wherein the enriched content comprises at least one of an audit of the electronic media item, a page number side car, a start reading location or an end reading location.

12. The system of claim 8, the popularity prediction module further to:
   provide the electronic media item with the enriched content to the user.

13. A non-transitory computer-readable storage medium storing instructions which, when executed, cause a processor to perform operations comprising:
   predicting a relative popularity level of an electronic media item using an output of a learned function created using a plurality of features from one or more other electronic media items that are determined to have met a popularity threshold;
   classifying, by the processor, the electronic media item as at least one of popular or not popular in relation to the popularity threshold based on the predicted relative popularity level output from the learned function before an initial release of the electronic media item; and
   when the electronic media item is classified as popular in relation to the popularity threshold, enhancing the electronic media item by adding enriched content before the initial release of the electronic media item.

14. The computer-readable storage medium of claim 13, wherein predicting whether the electronic media item will be popular comprises applying a feature of the electronic media item to the learned function.

15. The computer-readable storage medium of claim 13, wherein the popularity threshold comprises a number of glance views received by the one or more other electronic media items.

16. The computer-readable storage medium of claim 13, the operations further comprising:
   determining a confidence score for the classification, wherein the confidence score is the result of a logistic regression.

17. The computer-readable storage medium of claim 13, wherein the enriched content comprises at least one of an audit of the electronic media item, a page number side car, a start reading location or an end reading location.

18. The computer-readable storage medium of claim 13, the operations further comprising:
   providing the electronic media item with the enriched content to the user.

\* \* \* \* \*